United States Patent
Busker et al.

(10) Patent No.: US 10,972,029 B2
(45) Date of Patent: Apr. 6, 2021

(54) METHOD FOR OPERATING A WIND TURBINE

(71) Applicant: Wobben Properties GmbH, Aurich (DE)

(72) Inventors: Kai Busker, Großefehn (DE); Ingo Mackensen, Aurich (DE); Johannes Brombach, Berlin (DE); Eckard Quitmann, Bremen (DE); Hanna Emanuel, Bremen (DE); Martin Schellschmidt, Südbrookmerland (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/342,468

(22) PCT Filed: Oct. 27, 2017

(86) PCT No.: PCT/EP2017/077585
§ 371 (c)(1),
(2) Date: Apr. 16, 2019

(87) PCT Pub. No.: WO2018/078086
PCT Pub. Date: May 3, 2018

(65) Prior Publication Data
US 2020/0052628 A1    Feb. 13, 2020

(30) Foreign Application Priority Data
Oct. 28, 2016    (DE) .................. 10 2016 120 700

(51) Int. Cl.
*H02P 9/10*    (2006.01)
*F03D 9/25*    (2016.01)
(Continued)

(52) U.S. Cl.
CPC .............. *H02P 9/105* (2013.01); *F03D 9/257* (2017.02); *H02J 3/18* (2013.01); *H02J 3/24* (2013.01);
(Continued)

(58) Field of Classification Search
CPC .. H02P 9/105; H02P 9/42; F03D 9/257; H02J 3/18; H02J 3/24; H02J 3/386
See application file for complete search history.

(56) References Cited

U.S. PATENT DOCUMENTS

| 6,891,281 B2 | 5/2005 | Wobben |
| 6,946,751 B2 | 9/2005 | Yoshida et al. |

(Continued)

FOREIGN PATENT DOCUMENTS

| CL | 469-1987 | 5/1988 |
| CN | 1410669 A | 4/2003 |

(Continued)

OTHER PUBLICATIONS

"EirGrid Grid Code—Version 3.3," *EirGrid*, Jan. 30, 2009, retrieved from http://www.eirgrid.com/media/Grid%20Code%20v3.3.pdf, on Jun. 10, 2014, 26 pages.

(Continued)

*Primary Examiner* — Viet P Nguyen
(74) *Attorney, Agent, or Firm* — Seed IP Law Group LLP (57) ABSTRACT

A method for operating a wind power installation which is connected to a network connection point of an electrical supply network and is intended to produce and feed electrical energy into the electrical supply network, wherein the electrical supply network has a network nominal frequency and is operated at a network frequency, and the wind power installation which comprises an electrical generator with a generator nominal power can be regulated on the basis of the network frequency, comprising the steps of: using the elec-
(Continued)

trical generator to produce an electrical generator power for feeding into the electrical supply network, feeding the electrical generator power or a part of it into the electrical supply network as electrical feed-in power on the basis of the network frequency, wherein, in a first supporting stage, the electrical generator power is reduced on the basis of the network frequency in order to accordingly reduce the electrical feed-in power, and, in a second supporting stage, the electrical feed-in power is reduced such that the electrical feed-in power is less than the electrical generator power.

23 Claims, 5 Drawing Sheets

(51) Int. Cl.
  H02J 3/18    (2006.01)
  H02J 3/24    (2006.01)
  H02J 3/38    (2006.01)
  H02P 9/42    (2006.01)
  H02P 101/15  (2016.01)

(52) U.S. Cl.
  CPC .............. H02J 3/386 (2013.01); H02P 9/42 (2013.01); H02P 2101/15 (2015.01)

(56) References Cited

U.S. PATENT DOCUMENTS

| | | | |
|---|---|---|---|
| 7,345,373 B2 | 3/2008 | Delmerico et al. | |
| 7,372,173 B2 | 5/2008 | Lütze et al. | |
| 7,638,893 B2 | 12/2009 | Wobben | |
| 8,390,139 B2* | 3/2013 | Fortmann | H02J 3/18 290/44 |
| 8,400,003 B2 | 3/2013 | Letas et al. | |
| 9,279,411 B2* | 3/2016 | Beekmann | F03D 9/257 |
| 9,742,191 B2 | 8/2017 | Beekmann | |
| 2007/0047163 A1 | 3/2007 | Lutze et al. | |
| 2007/0085343 A1 | 4/2007 | Fortmann | |
| 2007/0120369 A1 | 5/2007 | Delmerico et al. | |
| 2008/0093857 A1 | 4/2008 | Stiesdal | |
| 2009/0167021 A1 | 7/2009 | Andersen | |
| 2009/0194995 A1 | 8/2009 | Delmerico et al. | |
| 2010/0090532 A1 | 4/2010 | Shelton et al. | |
| 2011/0187108 A1* | 8/2011 | Wakasa | F03D 7/0224 290/44 |
| 2012/0139241 A1* | 6/2012 | Haj-Maharsi | F03D 7/0224 290/44 |
| 2013/0033268 A1* | 2/2013 | Parkhou | F03D 9/255 324/511 |
| 2013/0193933 A1* | 8/2013 | Andresen | H02P 9/02 322/23 |
| 2014/0191507 A1* | 7/2014 | Holmberg | H02J 3/46 290/44 |
| 2015/0001931 A1 | 1/2015 | Banham-Hall et al. | |
| 2015/0105923 A1 | 4/2015 | Beekmann | |
| 2015/0311696 A1* | 10/2015 | Zhu | H02H 3/207 361/21 |
| 2016/0032891 A1 | 2/2016 | Busker et al. | |
| 2017/0244251 A1* | 8/2017 | Nielsen | H02H 7/067 |

FOREIGN PATENT DOCUMENTS

| | | |
|---|---|---|
| CN | 101054951 A | 10/2007 |
| DE | 10341504 A1 | 6/2005 |
| DE | 102005052011 A1 | 5/2007 |
| DE | 102008034531 A1 | 8/2009 |
| DE | 2573896 A1 | 3/2013 |
| DE | 102012203334 A1 | 9/2013 |
| DE | 102013206119 A1 | 10/2014 |
| DE | 102014104287 A1 | 10/2014 |
| EP | 1467463 A1 | 10/2004 |
| EP | 1790850 A1 | 5/2007 |
| EP | 1914419 A1 | 4/2008 |
| JP | 56-150999 A | 11/1981 |
| JP | 2002125317 A | 4/2002 |
| JP | 2003-535561 A | 11/2003 |
| JP | 2004301116 A | 10/2004 |
| JP | 2005-505223 A | 2/2005 |
| JP | 2006-296200 A | 10/2006 |
| JP | 2006-320198 A | 11/2006 |
| JP | 2008-278725 A | 11/2008 |
| JP | 2012-521513 A | 9/2012 |
| JP | 2015513890 A | 5/2015 |
| JP | 2016515675 A | 5/2016 |
| RU | 2073310 C1 | 2/1997 |
| RU | 2597235 C2 | 9/2016 |
| SU | 1163457 A1 | 6/1985 |
| WO | 94/27361 A1 | 11/1994 |
| WO | 00/73652 A1 | 12/2000 |
| WO | 01/86143 A1 | 11/2001 |
| WO | 03/023224 A1 | 3/2003 |
| WO | 03/030329 A1 | 4/2003 |
| WO | 2008/040350 A2 | 4/2008 |
| WO | 2010/108910 A2 | 9/2010 |

OTHER PUBLICATIONS

Altin et al., "Overview of Recent Grid Codes for Wind Power Integration," 12$^{th}$ International Conference on Optimization of Electrical and Electronic Equipment (OPTIM 2010), pp. 1152-1160, 2010.

Andresen et al., "Grid code and wind farm control requirements—What to control, why, where, and how," 7$^{th}$ International Workshop on Large Scale Integration of Wind Power and on Transmission Networks for Offshore Wind Farms, pp. 305-309, 2007.

Boëda et al. "Contribution of wind farms to frequency control and network stability," *Proc. Conf. EWEC*, Milano, Italia. 2007, 10 pages.

Cardinal et al., "Grid Friendly Wind Plant Controls: WindCONTROLTM—Field Test Results," American Wind Energy Conference, Pittsburgh, PA 2006, 8 pages.

Conroy et al., "Frequency Response Capability of Full Converter Wind Turbine Generators in Comparison to Conventional Generation," *IEEE Transactions on Power Systems* 23(2):649-656, May 2008.

Courtecuisse et al., "Capacity of a variable speed turbine to participate in primary frequency control," 6$^{th}$ International Workshop on Large-Scale Integration of Wind Power and Transmission Networks for Offshore Wind Farms, pp. 201-210, Oct. 26-27, 2006.

de Alegria et al., "Connection requirements for wind farms: A survey on technical requirements and regulation," *Renewable and Sustainable Energy Reviews* 11:1858-1872, 2007.

Ekanayake et al., "Comparison of the Response of Doubly Fed and Fixed-Speed Induction Generator Wind Turbines to Changes in Network Frequency," *IEEE Transactions on Energy Conversion* 19(4):800-802, Dec. 2004.

Ekraft System, "Wind Turbines Connected to Grids with Voltages above 100 kV: Technical regulation for the properties and the regulation of wind turbines," *Regulation TF 3.2.5, Transmission, Case No. 303, Doc. No. 214439 v3*, Dec. 3, 2004, 34 pages.

Enercon, "WindBlatt, "*Enercon Magazine for wind energy*, Issue 4, 2008, retrieved from http://www.enercon.de/p/downloads/WB-0408-en.pdf, on Jun. 10, 2014, 16 pages. (with English Translation).

Erlich et al., "WEA verändern dynamisches Netzverhalten: Dynamische Wechselwirkung zwischen Windparks und elecktrischem Verbundnetz: Dynamic interaction of wind farms with the electric power system," *EW* 101(20):60-65, 2002. (No English Abstract Available).

GE Energy, "WindINERTIA® Control," Fact Sheet, Feb. 2009, 1 page.

Grauers, "Synchronous generator and frequency converter in wind turbine applications: system design and efficiency", Technical report No. 175 L, May 1994, 4 pages.

Hau, *Windkraftanlagen: Grundlagen, Technik, Einsatz, Wirtschaftlichkeit*, 4$^{th}$ Edition, Springer, pp. 380-383, 394, 506, 2003, 8 pages. (with English Abstract).

(56) References Cited

OTHER PUBLICATIONS

Heier et al., *Grid Integration of Wind Energy Conversion Systems*, Chichester, John Wiley & Sons, 1998, 3 pages.

Hydro Québec TransÉnergie, "Transmission Provider Technical Requirements for the Connection of Power Plants to the Hydro-Québec Transmission System," *Montreal: HQTÉ*, Feb. 2009, 93 pages.

Koch et al., "Dynamic Interaction of large Offshore Wind Farms with the Electric Power System," *IEEE Bologna Power Tech Conference Proceedings* 3:1-7, Jun. 2003.

Kristoffersen, "The Horns Rev Wind Farm and the Operational Experience with the Wind Farm Main Controller," *Copenhagen Offshore Wind*, Oct. 26-28, 2005, 9 pages.

Lalor et al., "Frequency Control and Wind Turbine Technologies," *IEEE Transactions on Power Systems* 20(4):1905-1913, Nov. 2005.

Li et al., "Overview of different wind generator systems and their comparisons", *The Institution of Engineering and Technology Renewable Power Generation*, vol. 2, No. 2, 2008, pp. 123-138.

Meyer.. "Distributed Generation: towards an effective contribution to power system security," *Power Engineering Society General Meeting IEEE* Jun. 24-28, 2007, 6 pages.

Morren et al., "Inertial response of variable speed wind turbines," *Electric Power Systems Research* 76:980-987, 2006.

Morren et al., "Wind Turbines Emulating Inertia and Supporting Primary Frequency Control," *IEEE Transactions on Power Systems* 21(1):433-434, Feb. 2006.

Prillwitz et al., "Primärregelung mit Windkraftanlagen,"*ETG-Workship "Neue dezentrale Versorgungsstrukuren"* 19:1-6, Feb. 20, 2003.

Renewable Energy World, "GE Energy Unveils WindINERTIA & WindLAYOUT," retrieved from http://www.renewableenergyworld.com/rea/news/article/2009/03/ge-energy-unveils-windinertia-windlayout.html, Mar. 19, 2009, 1 page.

Salaberri et al., "Wind farms and conventional plants primary frequency control interaction," *EWEC* 2007, retrieved from http://www.ewea.org/ewec2007/allfiles2/209_Ewec2007fullpaper.pdf, on Jun. 10, 2014, 6 pages.

Sørensen et al., "Modeling of wind farm controllers," EWEC, Athens, Feb. 27-Mar. 2, 2006, 9 pages.

Sørensen et al., "Wind farm controllers with grid support," Proceedings of COW 2005, 2005, 8 pages.

Sørensen et al., "Wind power plants—status and visions," Technologies for sustainable energy development in the long term, Proceedings, Denmark, Forskningscenter Risoe., No. 1517(EN):259-271, 2005.

Ullah et al., "Temporary Primary Frequency Control Support by Variable Speed Wind Turbines—Potential and Applications," *IEEE Transactions on Power Systems* 23(2):601-612, May 2008.

Walling et al., "Advanced Wind Workshop on Large-Scale Integration Wind Farms, Delft, Netherlands, Plant Controls to Enhance Grid Integration," 6th International Workshop on Large-Scale Integration of Wind Power and Transmission Networks for Offshore Wind Farms, Delft, Netherlands, Oct. 26-28, 2006, 12 pages.

* cited by examiner

METHOD FOR OPERATING A WIND TURBINE

BACKGROUND

Technical Field

The present invention relates to a method for operating a wind power installation which is connected to a network connection point of an electrical supply network and is intended to produce and feed electrical energy into an electrical supply network. The present invention also relates to a wind power installation connected to a network connection point of an electrical supply network and to a wind farm connected to a network connection point.

Description of the Related Art

The practice of feeding electrical energy into an electrical supply network, for example the European integrated network, which has a network nominal frequency of 50 Hz, is generally known. Quite generally, electrical supply networks in this case have a safe network state, that is to say they are stable, in particular with respect to their network frequency at which they are operated. In this case, the network frequency usually therefore fluctuates only by a few hundredths of the network nominal frequency.

However, various faults in the electrical supply network, the so-called network faults, for example a short circuit, may result in the electrical supply network reaching a vulnerable network state. The network then has a disruption. However, disruptions may additionally also already be produced by disconnection of a large consumer or a large production unit.

An effect of such disruptions is, for example, the so-called overfrequency or the critical overfrequency. In such a case, the supply network then has a network frequency which is considerably above the network nominal frequency. For example, the network frequency is then 50.2 Hz even though the network nominal frequency is only 50 Hz.

In such a case, virtually all production units usually reduce their output power on the basis of the network frequency in order to participate in balancing the power equilibrium. This process is also referred to as overfrequency power reduction.

In this case, the overfrequency power reduction is fundamentally designed to stabilize the network frequency in the case of high levels of excess power. If this is not successful, the network frequency continues to rise to a critical threshold value, for example 51.5 Hz, at which the production units are generally disconnected from the supply network.

Wind power installations usually participate in the power reduction by adjusting the rotor blades, as a result of which the yield of the wind power installation is reduced and the electrical generator power is thereby reduced. The wind power installation then feeds less electrical power into the electrical supply network with a time delay.

As soon as the network frequency has then normalized again, the electrical generator power is accordingly increased in order to again feed more electrical power into the supply network, again with a time delay.

As a result of the increasing penetration of the electrical supply network with producers of renewable energies, for example wind power installations which are mostly coupled to the supply network, for example to a power inverter, using power electronics, the future supply network structures or network topologies will also change.

In particular, the number of predominantly conventional power plants will decrease greatly and therefore also the amount of flywheel masses in the supply network which have an attenuating, in particular frequency-fluctuation-attenuating, effect on the electrical supply network.

As a result, the behavior of the network can change and the stabilization of the network will become increasingly more difficult. In addition, this makes it necessary for producers of regenerative energies to be increasingly responsible for the stabilization of the network.

In the priority application for the present application, the German Patent and Trademark Office researched the following prior art: DE 10 2012 203 334 A1, DE 10 2013 206 119 A1 and DE 10 2014 104 287 A1.

BRIEF SUMMARY

Provided is a solution which makes it possible to react to future regulation problems in the supply network using a wind power installation.

Provided is a method for controlling a wind power installation connected to a network connection point of an electrical supply network. Accordingly, the wind power installation uses an electrical generator to produce an electrical generator power for feeding into the electrical supply network. The wind power installation then feeds this electrical generator power or a part of it into the electrical supply network as electrical feed-in power on the basis of the network frequency.

If the network frequency now changes, the method proposes reacting to the change in the network frequency in two stages, in particular by means of a first and a second supporting stage.

In the first supporting stage, the electrical generator power is reduced on the basis of the network frequency in order to accordingly reduce the electrical feed-in power. The electrical feed-in power is therefore reduced in the first supporting stage by accordingly reducing the electrical generator power, for example by adjusting the rotor blades of the wind power installation or changing the excitation current of the generator. This results in the generator producing or being able to produce less electrical power. The electrical feed-in power is therefore reduced in the first supporting stage using the electrical generator power.

In the second supporting stage, the electrical feed-in power is reduced such that the electrical feed-in power is less than the electrical generator power. This can be effected, for example, using a so-called power chopper which is set up to convert electrical energy into thermal energy. In this case, the power chopper is set up, in particular, to convert large powers, in particular the entire electrical feed-in power of the wind power installation. In this case, the power chopper preferably corresponds to the power class of the generator.

A reduction of the electrical feed-in power should therefore be understood as meaning, in particular, a desired technical power reduction which should be clearly distinguished from losses which usually occur.

Provided are at least two supporting stages for network support. Each supporting stage can contribute to supporting the electrical supply network in its own way. For this purpose, it is therefore proposed, in particular, to reduce the electrical feed-in power in the first supporting stage using the electrical generator power and to also or alternatively reduce it in the second supporting stage using an energy sink, for example a power chopper. The power chopper is therefore set up, in particular, to directly reduce the electrical feed-in power of the wind power installation.

The method therefore makes it possible to reduce the electrical feed-in power of a wind power installation in a particularly rapid manner. In particular, the proposed method therefore makes it possible to completely reduce the electrical feed-in power within less than 0.4 seconds, with the result that the wind power installation no longer feeds power into the supply network within a very short time, preferably within one second, in particular if accordingly required.

According to or in the second supporting stage, the electrical feed-in power is preferably reduced if the network frequency changes with a frequency gradient which exceeds a predetermined limiting gradient.

The second supporting stage is therefore activated if the electrical supply network has a frequency gradient which is greater than a predetermined limiting gradient. If, for example, the frequency gradient of the electrical supply network exceeds the predetermined limiting gradient, the power chopper is activated in order to reduce the electrical feed-in power of the wind power installation.

In this case, it is particularly advantageous that such a procedure has considerably smaller time constants than adjustment of the azimuth alignment of the wind power installation or adjustment of the rotor blades. The power is therefore reduced considerably more quickly in this second supporting stage than in the first supporting stage. However, it has been recognized that such a rapid reduction is not necessary in every situation. In order to also quickly determine whether such a rapid reduction is necessary or desirable, it is proposed here to assess a change in the network frequency on the basis of its frequency gradient. If its frequency gradient is below the limiting gradient, support in the first supporting stage, in which the generator power is reduced, can suffice, for example.

In this case, the predetermined limiting gradient is preferably selected according to the network connection point of the wind power installation; a predetermined limiting gradient of at least 0.4 Hz per second, in particular 0.5 Hz per second, has proved to be advantageous.

The network frequency gradient itself can be determined in this case by measuring the network frequency over time. This can be carried out locally by the wind power installation or the wind farm having the wind power installation, preferably by the wind farm control unit, or by the supply network operator who transmits the captured frequency gradient to the wind farm or to the wind power installation. Alternatively, the supply network operator can also transmit desired values for the wind farm or the wind power installation on the basis of the captured frequency gradient.

According to or in the second supporting stage, the electrical feed-in power is preferably reduced if the network frequency is above a predetermined frequency value.

The second supporting stage is therefore preferably activated if the network frequency is above a predetermined frequency value. In this case, the predetermined frequency value is greater than the network nominal frequency; for example, the predetermined frequency value is 50.2 Hz for a network nominal frequency of 50 Hz.

The second supporting stage then has a frequency dead band in which the second supporting stage is initially not triggered.

The fact that the electrical feed-in power is reduced according to the second supporting stage if the network frequency is above a predetermined frequency value can also or alternatively be carried out if the frequency gradient is above the limiting gradient.

If both a limiting gradient and an absolute frequency value are checked for using the second supporting stage, provision may be made for the second supporting stage to be activated if only one of the two criteria is satisfied or if both criteria are satisfied. A further criterion, for example further limit values, can also be provided in order to take both criteria into account together.

If both criteria are combined, provision may be made for a check to be carried out in order to determine whether the frequency gradient of the network frequency exceeds the predetermined limiting gradient only outside the frequency dead band. If then both the network frequency is above a predetermined frequency value and the network frequency changes with a frequency gradient which exceeds a predetermined limit value, the electrical feed-in power is reduced, in particular the second supporting stage is triggered or activated.

The predetermined frequency value is preferably in the range of 0.1% to 1% of the network nominal frequency, in particular in the range of 0.2% to 0.5%, and the preferred value of the limit value is 0.4% of the network nominal frequency.

According to or in the second supporting stage, the electrical feed-in power is preferably reduced if the electrical feed-in power is above a desired power for a predetermined period and/or at least by a predetermined exceedance value, in particular above a desired power which is less than the electrical generator power produced by the generator.

The second supporting stage is therefore particularly preferably also activated and the electrical feed-in power is also reduced when the electrical feed-in power is above a particular desired power for a predetermined period. This is the case, for example, when the electrical feed-in power must be reduced with a gradient which is not intended to be or cannot be complied with by the electrical generator for technical reasons, for example because the nacelle does not rotate quickly enough out of the wind and the yield of the wind power installation is therefore too high. The desired power is then quickly reduced according to the requirements, for example as a result of regulation or by virtue of another specification, but the actual reduction, that is to say the actual power, does not conform so quickly. The use of the second supporting stage is proposed for this purpose. In such a case, the electrical feed-in power is then reduced below the generator power currently being produced, in particular by means of a power chopper.

In this case, it is particularly advantageous that the wind power installation does not need to be exposed to unnecessarily high mechanical loads in order to reach any desired power values; in particular, such an embodiment enables a particularly gentle mode of operation of the installation, in particular for the drive train of the wind power installation.

According to or in the second supporting stage, the electrical feed-in power is preferably reduced if the second supporting stage is requested, in particular by an operator of the electrical supply network or by a control room.

This makes it possible, for example, for the wind power installation, even if it is not feeding electrical energy into the electrical supply network, to be able to be operated by the supply network operator as an energy sink or as a consumer, in particular of active power. A control input for such an external request signal can preferably be provided for this purpose.

The method therefore enables a network-supporting effect for wind power installations even if the generator of the wind power installation is not producing any electrical generator power for feeding into the electrical supply network. This has a particularly advantageous effect on the electrical supply network.

The second supporting stage is preferably carried out only after the first supporting stage has been run through.

The second supporting stage is therefore preferably activated only after the electrical generator power has been reduced on the basis of the network frequency. The electrical feed-in power is additionally reduced, for example by means of a power chopper, only when a reduction in the electrical generator power no longer suffices to provide a corresponding electrical feed-in power.

Alternatively, the second supporting stage is carried out independently of the first supporting stage.

It is particularly advantageous in this case that the method has two regulating sections which regulate the electrical feed-in power of a wind power installation on the basis of two different variables, namely on the basis of the network frequency deviation and the network frequency gradient. A quick control loop and a slow control loop are therefore provided or enabled.

If, for example, the network frequency, starting from 50 Hz, changes with a frequency gradient which is greater than 0.5 Hz per second, for example, the electrical feed-in power is preferably reduced by means of a power chopper. If, despite this measure, the network frequency now exceeds a predetermined desired frequency, for example of 50.2 Hz, the electrical generator power is additionally reduced, for example using the excitation of the generator. The reduction of the electrical generator power, that is to say the first supporting stage, is therefore additionally carried out for the purpose of reducing the electrical feed-in power, that is to say the second supporting stage, in particular if necessary.

The electrical generator power for feeding into the electrical supply network is preferably produced using the electrical generator on the basis of the network frequency, in particular on the basis of a deviation of the network frequency from the network nominal frequency, wherein the electrical generator power is reduced if the network frequency is above a predetermined desired frequency.

The generator is therefore preferably regulated on the basis of the network frequency. If the network frequency exceeds a particular desired frequency, for example 50 Hz or 50.2 Hz, the electrical generator power is therefore reduced such that the electrical feed-in power is also reduced. In contrast or additionally, if the network frequency changes with a frequency gradient which is greater than 0.5 Hz per second, for example, the feed-in power is preferably reduced independently of the electrical generator power. In this case, the electrical feed-in power can be reduced by converting electrical generator power into thermal power by means of a power chopper. The reduction of electrical feed-in power is therefore particularly preferably carried out from a reduction of the electrical feed-in power by reducing the electrical generator power. For this purpose, the generator is preferably controlled on the basis of another variable, in particular using the deviation of the network frequency from the network nominal frequency; the electrical generator is therefore not controlled or is not only controlled on the basis of the frequency gradient. The frequency gradient may be a trigger for frequency-dependent control.

The electrical feed-in power is preferably reduced such that the electrical feed-in power is equal to zero.

The wind power installation is therefore set up to reduce its electrical feed-in power from the nominal power to 0 power within the shortest time, for example by means of power destruction and/or power dissipation. For this purpose, the power chopper of the wind power installation has a corresponding power class which differs considerably from conventional brake choppers or crowbars, in particular with regard to the maximum electrical power which can be consumed, the service life and permissible power gradients.

Electrical power is preferably removed from the electrical supply network, in particular if the network frequency changes with a frequency gradient which exceeds a predetermined limit value and/or the network frequency is above a or the predetermined desired frequency.

Controlling the electrical generator power on the basis of a frequency deviation and controlling the electrical feed-in power on the basis of a frequency gradient makes it possible for the wind power installation to also be able to consume electrical power, in particular active power from the electrical supply network, in order to support the electrical supply network or to make a contribution to the frequency support which is greater than the installation or generator nominal power or at least greater than the current generator power.

In one preferred embodiment, the wind power installation is set up to feed electrical reactive power into the electrical supply network and to draw electrical active power from the electrical supply network. For this purpose, in a wind power installation with a full converter concept, for example, the power chopper is arranged in the DC voltage intermediate circuit of the full converter and the inverter of the full converter has a bidirectional design in order to remove active power from the electrical supply network and to convert it into thermal power using the power chopper, while the wind power installation continues to feed reactive power into the electrical supply network.

At least two-quadrant operation is therefore enabled, namely feeding in reactive power and removing active power. The method can also be applied to already existing wind power installation models. Electrical power, in particular active power, is preferably removed from the electrical supply network on the basis of a frequency gradient and/or on the basis of a frequency deviation.

It is preferably proposed that the predetermined limit value of the frequency gradient is 0.5 Hz per second. Therefore, the electrical feed-in power is reduced only when the network frequency changes with a frequency gradient which is greater than 0.5 Hz per second. Below the preferred limit value of 0.5 Hz per second, the power which has been fed in is therefore adjusted solely via the electrical generator power. Below the preferred limit value of 0.5 Hz per second, the electrical feed-in power is therefore determined substantially completely by the electrical generator power. That is to say, the electrical power produced by the generator is completely fed into the electrical supply network minus any losses and the personal requirement of the wind power installation. If the predetermined limit value of 0.5 Hz per second is exceeded, the electrical feed-in power is additionally reduced, for example by converting electrical generator power into thermal power.

The method therefore makes it possible to reduce the electrical power which has been fed in in a manner, in particular at a speed, which usually cannot be achieved with a simple rotor blade adjustment. In addition, the method is particularly gentle for the generator of the wind power installation since its excitation does not need to be suddenly changed in order to quickly reduce the power, but rather can be adjusted with high time constants.

The predetermined limit value may also be between 0.5 Hz per second and 2 Hz per second, for example 0.6 Hz per second or 1.2 Hz per second, depending on the network topology or as required, in particular by the network operator. This is advantageous, in particular, for weak electrical supply networks, that is to say in those which, on account of their topology, have a high frequency variance anyway which is also permitted.

The electrical feed-in power is preferably reduced such that the electrical feed-in power is equal to the electrical generator power if the network frequency changes with a frequency gradient which undershoots the predetermined limit value, in particular undershoots said value again. According to this embodiment, the feed-in power is therefore reduced only in the case of a high frequency gradient below the generator power.

If the electrical supply network therefore recovers again, that is to say the frequency gradient of the network frequency normalizes again, that is to say becomes smaller and undershoots the predetermined limit value again, the reduction of the feed-in power is preferably stopped. Electrical generator power is therefore no longer converted into thermal power if the frequency gradient of the network frequency undershoots the predetermined limit value again.

According to one preferred embodiment, it was also identified that a maximum limit of the predetermined gradient of 2 Hz per second is particularly advantageous since the method can also be used as an alternative to a complete disconnection of the wind power installation.

The method can therefore also be used instead of disconnecting the wind power installation, as should otherwise be initiated at 2 Hz per second, for example.

The reduction of the electrical feed-in power preferably comprises consuming electrical power, in particular consuming the at least one part of the electrical generator power, which is carried out at least partially by means of a switching device for converting electrical power into thermal power.

The electrical feed-in power is therefore reduced by consuming the electrical generator power or a part of it. In this case, the electrical generator power is consumed by means of a switching device which converts electrical power into thermal power, for example using a powerful resistance circuit or a large chopper, in particular a power chopper. The wind power installation and the resistance circuit or the chopper are designed in this case such that they convert an accordingly large electrical power into thermal power in order to reduce the electrical power which has been fed in independently of the electrical generator power.

The switching device for converting electrical power into thermal power is preferably set up to convert electrical power corresponding to the generator nominal power into thermal power for at least three seconds, in particular at least five seconds.

The switching device is therefore at least set up to convert the complete generator power into thermal power for at least three seconds such that the electrical power which has been fed in is reduced to zero. The wind power installation is therefore set up to not feed any electrical power into the electrical supply network for at least three seconds even though the generator is operated with nominal power and produces an electrical generator power corresponding to the generator nominal power.

The switching device for converting electrical power into thermal power is particularly preferably set up to convert electrical power corresponding to twice the generator nominal power into thermal power for at least three seconds, in particular at least five seconds.

In one particularly preferred embodiment, the switching device is set up to consume twice the generator nominal power or to convert it into heat for at least three seconds, preferably five seconds. The wind power installation is therefore set up to not feed any electrical power into the electrical supply network for at least three seconds, even though the generator is operated with nominal power and produces an electrical generator power corresponding to the generator nominal power, and can additionally remove electrical power, in particular active power corresponding to the generator power, from the electrical supply network.

The switching device for converting electrical power into thermal power therefore comprises at least one chopper or is in the form of a chopper or a resistance circuit and is preferably arranged in the DC voltage intermediate circuit of an inverter of the wind power installation, in particular in the DC voltage intermediate circuit of the full converter of the wind power installation.

The switching device therefore has a corresponding size; in particular, the switching device consists of a multiplicity of choppers which are arranged parallel to one another in order to convert as much electrical power as possible into thermal power, in particular heat, over a long period. However, a plurality or a multiplicity of choppers can also be referred to as a chopper or a chopper bank.

Provided is a method for operating a wind power installation which is connected to a network connection point of an electrical supply network, wherein the electrical supply network has a network frequency, and the wind power installation which comprises an electrical generator with a generator nominal power can be regulated on the basis of the network frequency. This method comprises the step of converting electrical power into thermal power, wherein the electrical power is removed from the electrical supply network in order to support the network frequency of the supply network if the network frequency changes with a frequency gradient which exceeds a predetermined limit value.

The method therefore makes it possible to consume electrical power, in particular active power, from the electrical supply network even if the wind power installation itself does not feed in power. The wind power installation is then operated solely as a consumer, wherein the consumer property of the wind power installation is enabled by means of a switching device described above or below. In addition, the wind power installation is set up to operate, if necessary, as an electrical consumer, in particular a large consumer with a nominal power of more than 1 MW.

Provided is a wind power installation comprising a generator with a generator nominal power for producing an electrical generator power, wherein the wind power installation is set up to be connected to a network connection point of an electrical supply network in order to feed the electrical generator power or a part of it into the electrical supply network as electrical feed-in power on the basis of a network frequency of the electrical supply network, and wherein the wind power installation is set up to carry out a method described above or below.

In particular, the wind power installation is set up such that, in a first supporting stage, the electrical generator power is reduced on the basis of the network frequency in order to accordingly reduce the electrical feed-in power, and, in a second supporting stage, the electrical feed-in power is reduced such that the electrical feed-in power is less than the electrical generator power. For this purpose, the wind power installation preferably has a corresponding feed-in control unit which can both control the generator or can at least trigger control of the generator and can control the second supporting stage. In order to control the second supporting stage, the feed-in control unit is connected, in particular, to a device for consuming electrical energy in order to control this device such that it consumes energy for the purpose of carrying out the second supporting stage.

The wind power installation preferably comprises a switching device for converting electrical power into thermal power, wherein the switching device is set up to consume at least part of the electrical generator power in order to reduce the electrical feed-in power. In particular, the switching device is connected to the feed-in control unit, with the result that the feed-in control unit can control the switching device in order to thereby cause the conversion of electrical power into thermal power.

The switching device for converting electrical power into thermal power is preferably set up to convert electrical power corresponding to a generator nominal power, preferably twice a generator nominal power, into thermal power for at least three seconds, in particular at least five seconds.

The switching device is particularly preferably in the form of a chopper bank or a power chopper bank and/or comprises a rectifier.

The power chopper or the power chopper bank can therefore be arranged both in the DC voltage intermediate circuit and at the inverter output of the wind power installation in order to convert electrical generator power into thermal power in order to reduce the electrical feed-in power of the wind power installation. At the input, the chopper bank preferably has a diode rectifier which is set up to consume the electrical generator power at the output of an inverter of the wind power installation.

Provided is a wind farm comprising at least one wind power installation described above or below, wherein the wind farm has a wind farm control unit which is set up to transmit control signals to the wind power installations in the wind farm and to receive status signals provided by the wind power installations in the wind farm in order to determine a negative electrical wind farm power or energy.

The wind farm therefore has a farm control unit which is set up to determine the possible negative powers or energies of the individual wind power installations in the wind farm which are provided by the wind power installations, in particular by their switching devices which are set up to carry out a method described above or below. In this case, negative power or energy is power or energy by which the power or energy currently fed in can be reduced. As a result, it is possible to plan or at least determine a reduction of the power which is fed in, in particular. Since it is also important to consider the time during which the reduction can or is intended to be carried out, consideration of the energy is preferably proposed.

Provided is a method for controlling a wind farm described above or below, comprising the steps of: requesting status signals from the wind power installations, in particular the readiness of the switching devices of the wind power installations to consume energy, determining a negative electrical wind farm power or energy on the basis of the requested status signals from the wind power installations, and providing a supply network operator and/or a control room controlling the wind farm with the determined negative electrical wind farm power or energy.

BRIEF DESCRIPTION OF THE SEVERAL VIEWS OF THE DRAWINGS

The determined negative powers or energies of the individual wind power installations which are provided by the switching devices of the wind power installations are added up to form a negative electrical wind farm power or energy and are made available to the supply network operator, for example, as information. The supply network operator can then retrieve this negative wind farm power or energy provided in this manner if necessary in order to support the electrical supply network. The present invention is now explained in more detail below by way of example on the basis of exemplary embodiments with reference to the accompanying figures.

DETAILED DESCRIPTION

Figure 1:
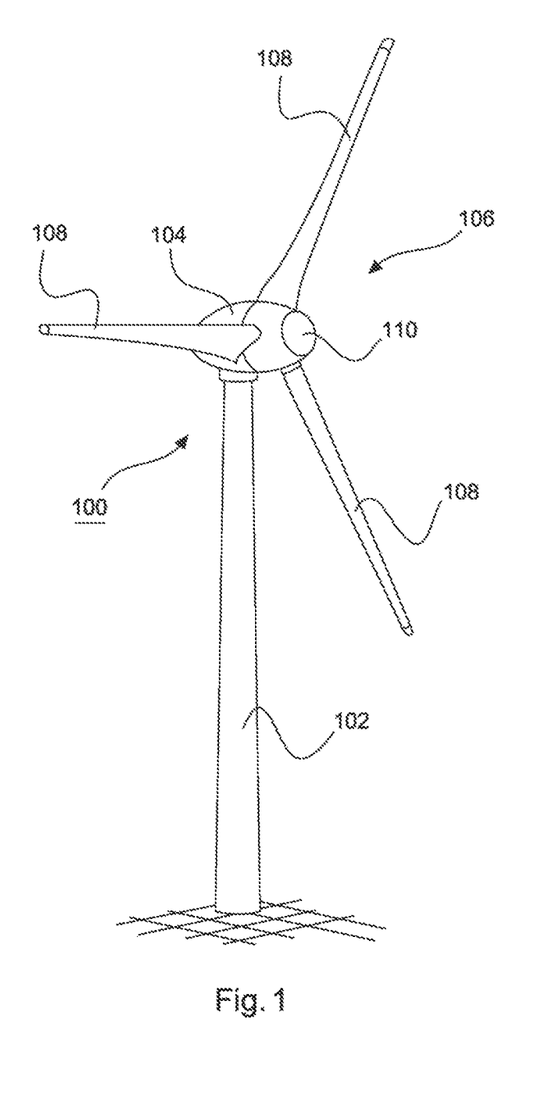
FIG. 1 shows a schematic view of a preferred wind power installation.

FIG. 1 shows a wind power installation 100 for producing and feeding electrical energy into an electrical supply network.

For this purpose, the wind power installation 100 has a tower 102 and a nacelle 104. An aerodynamic rotor 106 having three rotor blades 108 and a spinner 110 is arranged on the nacelle 104. During operation, the rotor 106 is caused to rotate by the wind and thereby drives an electrical generator in the nacelle 104, wherein the generator is preferably in the form of a six-phase ring generator.

Figure 2:
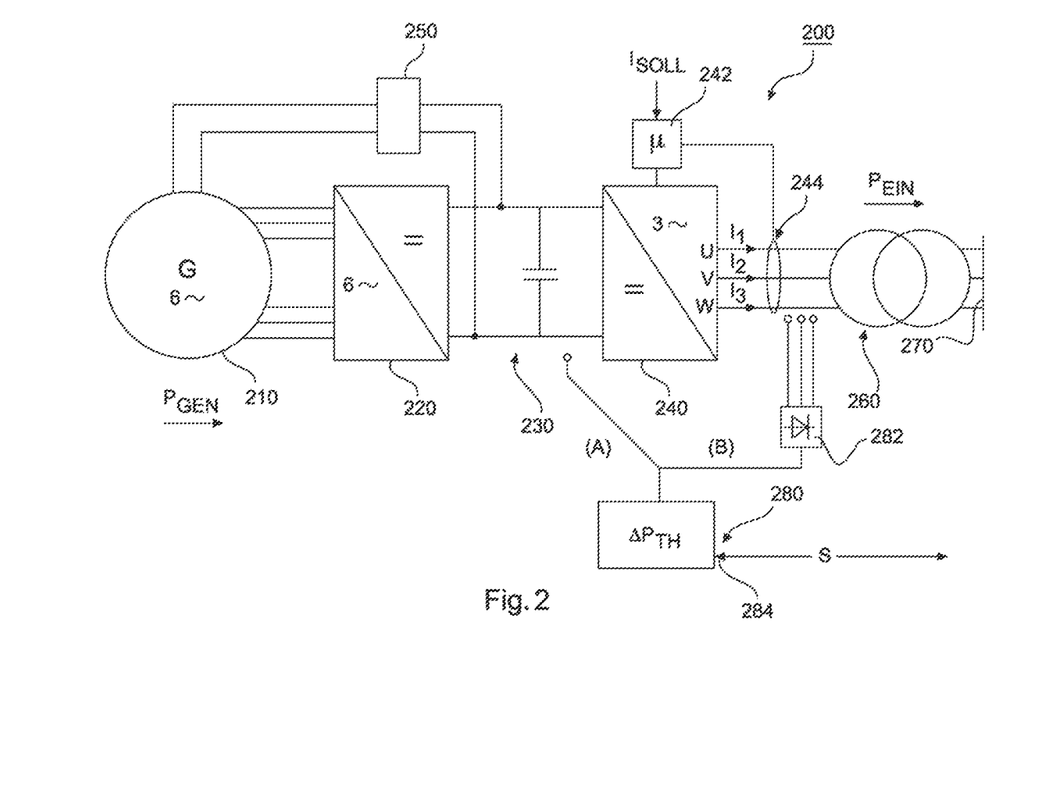
FIG. 2 shows a schematic structure of an electrical section of a wind power installation for producing and feeding in electrical energy according to one embodiment.

FIG. 2 shows, in a simplified manner, an electrical section 200 of a wind power installation shown in FIG. 1.

The electrical section 200 has a six-phase ring generator 210 with a generator nominal power for producing an electrical generator power $P_{GEN}$, which generator is caused to rotate by the wind via a mechanical drive train of the wind power installation in order to produce a six-phase electrical alternating current. The six-phase electrical alternating current is transferred, by the electrical generator 210, to the rectifier 220 which is connected to the three-phase inverter 240 via a DC voltage intermediate circuit 230. The six-phase ring generator 210 which is in the form of a synchronous generator is controlled in this case via excitation 250 from the DC voltage intermediate circuit 230, wherein the excitation can also be supplied from another source, in particular by means of a separate current controller.

The electrical section 200 therefore has a full converter concept in which the electrical feed-in power $P_{EIN}$ is fed into the network 270 by means of the three-phase inverter 240 via the wind power installation transformer 260. This network 270 is usually a wind farm network which feeds an electrical supply network via a wind farm transformer.

In order to produce the three-phase current $I_1$, $I_2$, $I_3$ for each of the phases U, V, W, the inverter 240 is controlled with a tolerance band method. In this case, the control is effected via the controller 242 which captures each of the three currents $I_1$, $I_2$, $I_3$ produced by the inverter 240 by means of a current capture unit 244. The controller 242 is therefore set up to individually control each phase of the inverter 240 by means of the current capture unit 244. For this purpose, a desired current value $I_{SOLL}$ can be specified to the controller 242, on the basis of which the currents $I_1$, $I_2$, $I_3$ are adjusted. The desired current value $I_{SOLL}$ is preferably individually calculated for each phase U, V, W inside the installation and is specified for the controller 242.

The electrical section 200 also has a switching device 280 for converting electrical power into thermal power, which switching device is set up to convert electrical power corresponding to twice the generator nominal power into thermal power $\Delta P_{TH}$ for at least five seconds.

The switching device 280 can be connected either (A) to the DC voltage intermediate circuit 230 or (B) to the phases U, V, W between the inverter 240 and the wind power installation transformer 260 via a diode rectifier 282 in order to reduce the electrical feed-in power $P_{EIN}$ such that the electrical feed-in power $P_{EIN}$ is less than the electrical generator power $P_{GEN}$ if the network frequency changes with a frequency gradient which exceeds a predetermined limit value. The switching device 280 is therefore set up to convert large powers.

In order to reduce the electrical feed-in power $P_{EIN}$, the switching device 280 has a control input 284 for receiving control signals S from the wind power installation controller or from the wind farm controller and for transferring or returning further signals to the controllers.

If, for example, the network frequency changes with a frequency gradient which exceeds a predetermined limit value, the switching device 280 is activated in order to reduce the feed-in power $P_{EIN}$. The electrical generator power $P_{GEN}$ produced by the generator 210 is therefore reduced by means of the switching device 280 in such a manner that the feed-in power $P_{EIN}$ is reduced. The switching device 280 is therefore an apparatus for converting high electrical powers into thermal power. For this purpose, the switching device is preferably in the form of a chopper bank for converting large powers and energies. The switching device 280 is also controlled on the basis of the network frequency, in particular on the basis of a frequency gradient.

Figure 3:
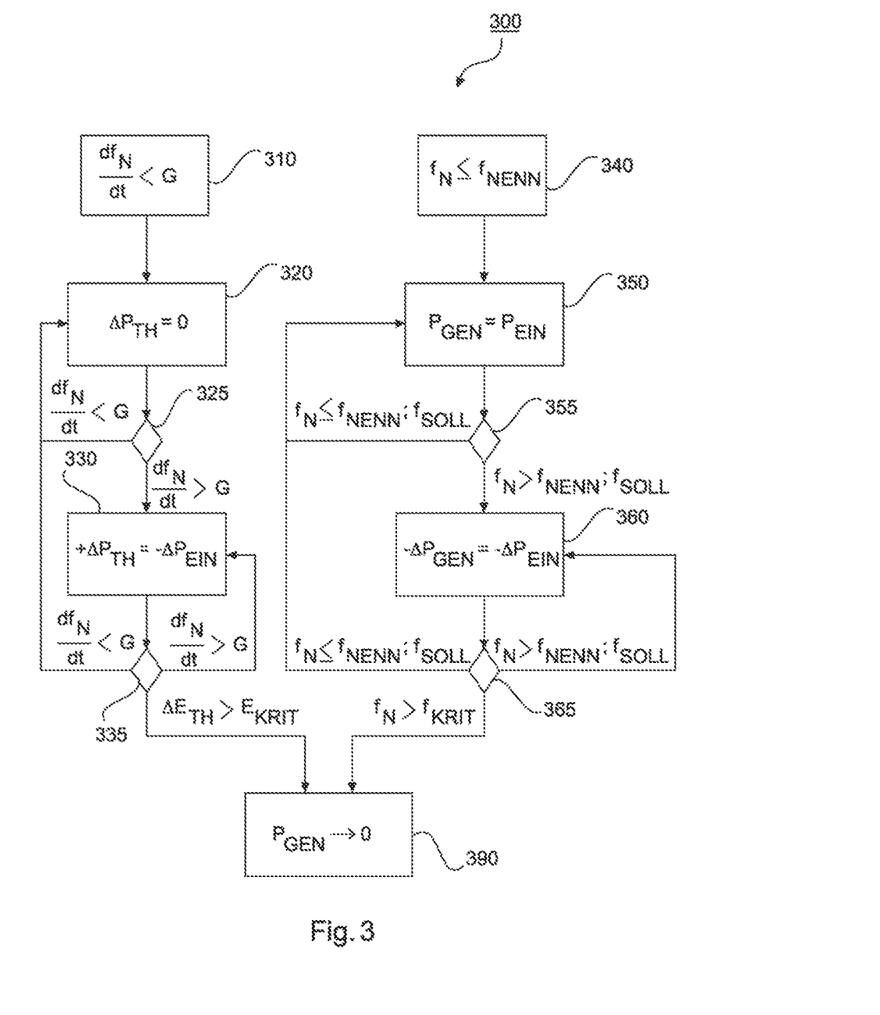
FIG. 3 schematically shows a sequence of the method for operating a wind power installation in one preferred embodiment.

FIG. 3 schematically shows a sequence 300 of the method for operating a wind power installation in one preferred embodiment. The method relates, in particular, to the reduction of the electrical feed-in power in such a manner that the electrical feed-in power is less than the electrical generator power if the network frequency changes with a frequency gradient which exceeds a predetermined limit value.

For this purpose, the generator of the wind power installation produces an electrical generator power for feeding into the electrical supply network while the supply network is in a stable state. This means, in particular, that the network frequency $f_N$ corresponds substantially to the network nominal frequency $f_{NENN}$ and the frequency gradient of the network frequency $df_N/dt$ is less than the predetermined limit value G. Block 310 indicates that the frequency gradient of the network frequency $df_N/dt$ is less than the predetermined limit value G of the frequency gradient and block 340 indicates that the network frequency $f_N$ corresponds substantially to the network nominal frequency $f_{NENN}$.

If the frequency gradient of the network frequency $df_N/dt$ is less than the predetermined limit value G, the switching device for converting electrical power into thermal power does not convert any thermal power $\Delta P_{TH}$. This is indicated by block 320.

The check in order to determine whether the frequency gradient of the network frequency $df_N/dt$ is less than the predetermined limit value G is dynamically carried out, for example by capturing the network frequency $f_N$ and subsequently averaging the dynamically captured network frequency $f_N$ over time t. Block 325 indicates the dynamic capture of the frequency gradient of the network frequency $df_N/dt$.

If the frequency gradient of the network frequency $df_N/dt$ is less than the predetermined limit value G, the switching device still does not convert any thermal power $P_{TH}$.

However, if the frequency gradient of the network frequency $df_N/dt$ exceeds the predetermined limit value G, the switching device converts electrical power, in particular part of the electrical generator power $P_{GEN}$, into thermal power $P_{TH}$. This directly reduces the electrical feed-in power $P_{EIN}$. Block 330 indicates that the electrical feed-in power $P_{EIN}$ is directly reduced by converting electrical power into thermal power $\Delta P_{TH}$.

If the frequency gradient of the network frequency $df_N/dt$ is then less than the predetermined limit value G again, the switching device stops the conversion of the electrical power.

If the frequency gradient of the network frequency $df_N/dt$ still exceeds the predetermined limit value G, electrical power continues to be converted and the absolute value of the converted electrical power is increased further.

In order to prevent overloading of the switching device, the temperature of the switching device is preferably monitored. This is indicated by block 335.

If the converted thermal energy $\Delta E_{TH}$ exceeds a critical limit value $E_{KRIT}$, the electrical generator power $P_{GEN}$ is additionally reduced or the electrical generator is powered down such that the wind power installation no longer feeds in any electrical power. This is indicated by block 390.

The method can therefore be carried out independently of the generator control which regulates a generator on the basis of the network frequency.

The generator regulation is preferably operated independently of the control of the switching device.

If the network frequency $f_N$ is substantially less than or equal to the network nominal frequency $f_{NENN}$, the generator preferably feeds the entire electrical generator power $P_{GEN}$ produced into the electrical supply network as electrical feed-in power $P_{EIN}$. This is indicated by block 350.

The check in order to determine whether the network frequency $f_N$ is less than or equal to the network nominal frequency $f_{NENN}$ or is less than or equal to a predetermined desired frequency $f_{SOLL}$ is indicated by block 355. For example, if the network nominal frequency is 50 Hz and the desired frequency is 50.1 Hz, the generator then has a type of dead band in its regulation. The network frequency $f_N$ can also be captured by a wind farm control unit which determines, by means of a comparison, whether the network frequency $f_N$ exceeds the network nominal frequency $f_{NENN}$ or the desired frequency $f_{SOLL}$.

If the network frequency $f_N$ is substantially less than or equal to the network nominal frequency $f_{NENN}$ or the desired frequency $f_{SOLL}$, the generator still feeds the entire electrical generator power $P_{GEN}$ produced into the electrical supply network as electrical feed-in power $P_{EIN}$.

However, if the network frequency $f_N$ exceeds the network nominal frequency $f_{NENN}$ or the desired frequency $f_{SOLL}$, the electrical generator power $P_{GEN}$ is reduced. The generator then feeds a reduced electrical generator power $P_{GEN}$ into the electrical supply network as electrical feed-in power $P_{EIN}$. Block 360 indicates the fact that the generator feeds a reduced electrical generator power into the electrical supply network as electrical feed-in power $P_{EIN}$ on the basis of the network frequency $f_N$ if a desired frequency $f_{SOLL}$ is exceeded.

If the network frequency $f_N$ now undershoots or corresponds to the network nominal frequency $f_{NENN}$ or the desired frequency $f_{SOLL}$ again, the electrical generator retains its state and is started up again.

If the network frequency $f_N$ still exceeds the network nominal frequency $f_{NENN}$ or the desired frequency $f_{SOLL}$, the electrical generator power $P_{GEN}$ is again or still reduced.

If the network frequency $f_N$ nevertheless exceeds a critical frequency $f_{KRIT}$ specified by the network operator, for example, the electrical generator power $P_{GEN}$ is considerably reduced or the generator is changed to a state in which it no longer produces any electrical generator power. Block 390 indicates the fact that the electrical generator is powered down such that the wind power installation no longer feeds in any electrical power.

Figure 4:
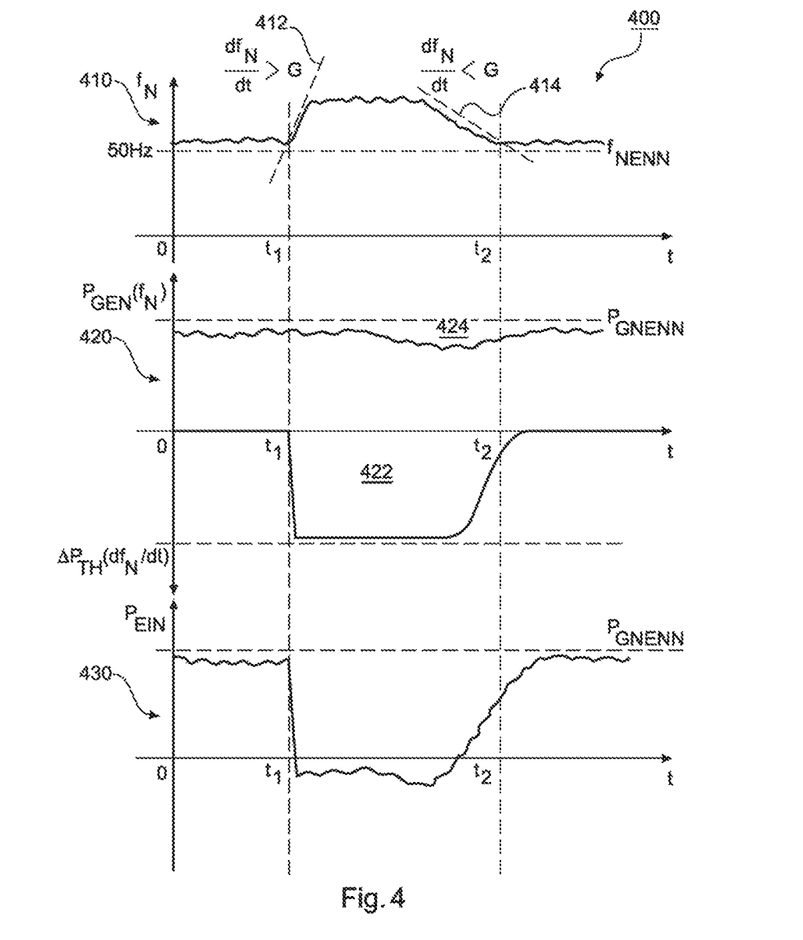
FIG. 4 schematically shows an overfrequency power consumption with a wind power installation according to one embodiment.

FIG. 4 schematically shows an overfrequency power consumption 400 with a wind power installation according to one embodiment. In this case, in particular, the method of operation of the method is shown on the basis of a fluctuation in the network frequency $f_N$.

The network frequency $f_N$ is plotted against the time t in the upper graph 410. In this case, the network frequency is a few hundredths more than the network nominal frequency $f_{NENN}$ of 50 Hz, for example 50.02 Hz, and fluctuates slightly. Until the time t1, the electrical supply network therefore behaves in a substantially frequency-stable manner, that is to say it does not have any major frequency deviation or a relatively steep frequency gradient.

The electrical generator power $P_{GEN}$ is plotted against the time in the central graph 420. In this case, the generator is controlled on the basis of the network frequency $f_N$ and produces the slightly oscillating generator power $P_{GEN}$. The thermal power $\Delta P_{TH}$ converted by the switching device is likewise depicted in the central graph 420. In this case, the switching device is controlled on the basis of the frequency gradient $df_N/dt$. Since the electrical supply network does not have a frequency gradient $df_N/dt$ which exceeds the predetermined limit value G, no electrical power, in particular electrical generator power, is converted into thermal power.

The electrical feed-in power $P_{EN}$ results from the electrical generator power $P_{GEN}$ and the thermally converted power and, until the time t1, corresponds substantially to the electrical generator power $P_{GEN}$. This is shown in the lower graph 430.

At the time t1, the electrical supply network has a disruption in the form of a frequency gradient 412 which is greater than the predetermined limit value G. This can be captured by means of a measuring device, for example.

The switching device, in particular the power chopper, is then activated. This is shown in the lower half-plane 422 of the central graph. The electrical generator which is controlled on the basis of a frequency deviation remains unaffected by this, at least for the time being.

The switching-on of the switching device results in both the entire electrical generator power $P_{GEN}$ and a part of the electrical power removed from the electrical supply network, in order to stabilize the electrical supply network, being converted into thermal power, in particular heat. This is illustrated in the graph 430. The switching device therefore not only reduces the electrical feed-in power to 0 by converting the electrical generator power into thermal power but also converts additional excess power, in particular active power, from the electrical supply network into thermal power. The wind power installation therefore has a negative power, in particular a negative active power balance, at the connection point.

On account of this measure, the network frequency slowly recovers again, with the result that the network frequency with a frequency gradient 414 approaches the network nominal frequency, wherein the frequency gradient 414 is less than the predetermined limit value.

The switching device hereupon slowly reduces its power consumption of the electrical generator power until the supply network again has a frequency-stable state at the time t2.

During the performance of the method, the electrical generator power is preferably also reduced on the basis of the network frequency, in particular if a frequency deviation is more than 0.2 Hz from the network nominal frequency and lasts for more than five seconds. This is illustrated, by way of example, in the central graph 420 in the region 424.

Figure 5:
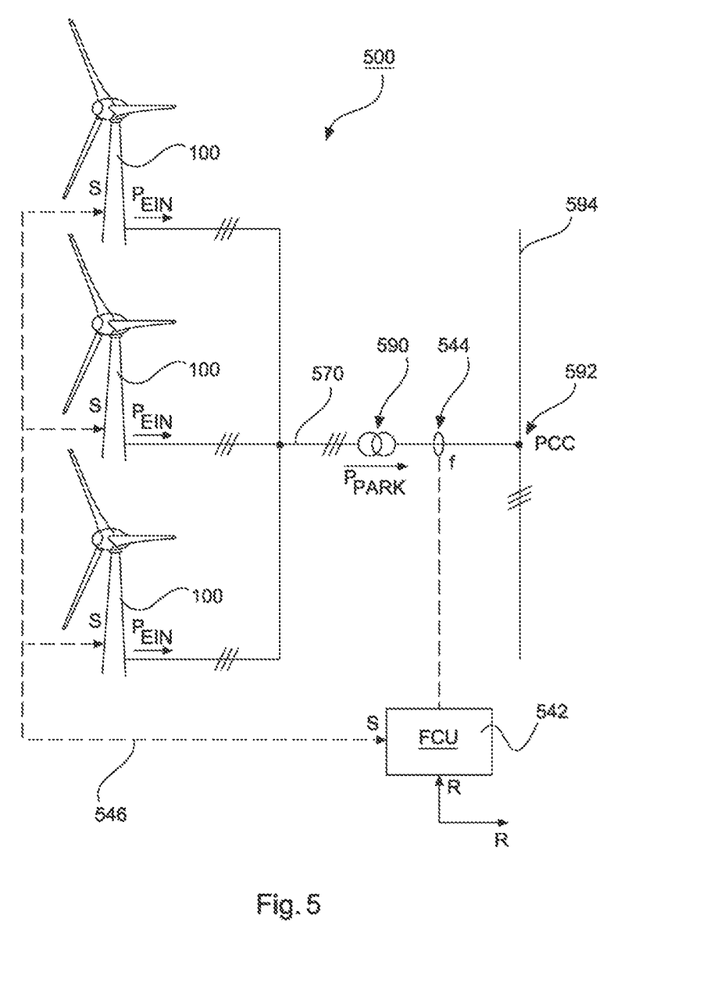
FIG. 5 shows a schematic structure of a wind farm for producing and feeding in electrical energy according to one embodiment.

FIG. 5 shows a wind farm 500 having, by way of example, three wind power installations 100 according to FIG. 1. The three wind power installations are therefore representative of fundamentally any desired number of wind power installations in a wind farm 500. The wind power installations 100 provide their electrical feed-in power $P_{EN}$ via an electrical wind farm network 570. These individual feed-in powers $P_{EN}$ are fed into the supply network 594 together as a wind farm power $P_{PARK}$ at a network connection point PCC via the wind farm transformer 590 which steps up the voltage in the farm.

In this case, the wind farm 500 is controlled via a wind farm control unit 542 which is also referred to as a farm control unit FCU. For this purpose, the wind farm control unit 542 captures the network frequency and, in particular, the frequency deviation and the frequency gradient by means of measuring means 544. The wind farm control unit can also communicate with the individual wind power installations via the control lines 546. In particular, status signals S from the wind power installation, for example the energy consumption readiness of the switching devices, can be requested thereby. On the basis of these requested status signals S, the wind farm control unit 542 can calculate a negative electrical wind farm energy, that is to say the energy which the wind farm is ready to consume. This negative wind farm energy calculated in this manner is then made available to a supply network operator by means of reduction signal R. The supply network operator is therefore always informed of how much electrical power, in particular active power, the wind farm can consume and can in turn also request this. The wind farm is therefore set up to act as a consumer of active power for at least five seconds, in particular with a negative power corresponding to the wind farm nominal power.

The invention claimed is:

1. A method for operating a wind power installation that is connected to a network connection point of an electrical supply network, wherein the wind power installation is configured to produce and provide electrical energy into the electrical supply network, wherein the electrical supply network has a network nominal frequency and is operated at a network frequency, and wherein the wind power installation comprises an electrical generator with a generator nominal power, wherein the electrical generator is configured to be regulated based on the network frequency, the method comprising:

using the electrical generator to produce an electrical generator power for providing into the electrical supply network;

converting the electrical generator power into a first portion; and providing at least the first portion of the electrical generator power into the electrical supply network as electrical feed-in power based on the network frequency, wherein:
in a first supporting stage, the method comprises:
receiving, from a controller, a fed back signal representative of the network frequency, wherein the electrical generator power is reduced based on the network frequency to reduce the electrical feed-in power, and
in a second supporting stage, the method comprises:
drawing power from the electrical feed-in power to reduce the electrical feed-in power such that the electrical feed-in power is less than the electrical generator power, wherein the second supporting stage is implemented after the first supporting stage has been completed.

2. The method as claimed in claim 1, wherein in the second supporting stage, the electrical feed-in power is reduced if the network frequency changes with a frequency gradient which exceeds a predetermined limiting gradient.

3. The method as claimed in claim 1, wherein in the second supporting stage, the electrical feed-in power is reduced if the network frequency is above a predetermined frequency value.

4. The method as claimed in claim 1, wherein in the second supporting stage, the electrical feed-in power is reduced if the electrical feed-in power is above a particular power for a predetermined period or exceeds a predetermined power value.

5. The method as claimed in claim 1, wherein in the second supporting stage, the electrical feed-in power is reduced if the second supporting stage is requested by an operator.

6. The method as claimed in claim 1, wherein the second supporting stage is implemented independently of the first supporting stage.

7. The method as claimed in claim 1, wherein the electrical generator power is produced using the electrical generator based on a deviation of the network frequency from the network nominal frequency, wherein the electrical generator power is reduced if the network frequency is above a predetermined desired frequency.

8. The method as claimed in claim 1, wherein the electrical feed-in power is reduced such that the electrical feed-in power is equal to zero.

9. The method as claimed in claim 1, further comprising:
removing electrical power from the electrical supply network if the network frequency changes with a frequency gradient that exceeds a predetermined limiting gradient and/or the network frequency is above a predetermined frequency value.

10. The method as claimed in claim 9, wherein the predetermined limiting gradient is at least one of:
0.5 Hz per second;
between 0.5 Hz per second and 2 Hz per second; and
2 Hz per second.

11. The method as claimed in claim 1, wherein the electrical feed-in power is reduced in the second supporting stage such that the electrical feed-in power is equal to the electrical generator power if the network frequency changes with a frequency gradient which undershoots a predetermined limiting gradient.

12. The method as claimed in claim 1, wherein the reduction of the electrical feed-in power in the second supporting stage comprises consuming electrical power chosen from at least one of the electrical generator power and electrical power from the electrical supply network, wherein the consuming comprises using a switching device for converting the electrical power into thermal power.

13. The method as claimed in claim 12, wherein the switching device for converting electrical power into the thermal power is configured to convert electrical power corresponding to the generator nominal power into the thermal power for at least three seconds.

14. The method as claimed in claim 12, wherein the switching device for converting electrical power into the thermal power is configured to convert electrical power corresponding to twice the generator nominal power into the thermal power for at least three seconds.

15. The method as claimed in claim 12, wherein the switching device comprises at least one chopper.

16. The method as claimed in claim 12, wherein the switching device is a chopper bank.

17. The method as claimed in claim 1 comprising:
converting electrical power that is removed from the electrical supply network to support the network frequency of the electrical supply network if the network frequency changes with a frequency gradient which exceeds a predetermined limit value.

18. A wind power installation, comprising:
an electrical generator with a generator nominal power for producing electrical generator power, wherein the wind power installation is configured to convert the electrical generator power into a first portion, and the wind power installation is configured to be connected to a network connection point of an electrical supply network to provide the first at least the portion of the electrical generator power into the electrical supply network as an electrical feed-in power based on a network frequency of the electrical supply network;
a rectifier coupled to an output of the electrical generator;
a direct current (DC) intermediate circuit coupled to an output of the rectifier;
an inverter coupled to an output of the DC intermediate circuit; and
a switching device, coupled to the DC intermediate circuit and an output of the inverter, configured to:
in a first supporting stage, receive, from a controller, a fed back signal representative of the network frequency, and reduce the electrical generator power based on the network frequency to reduce the electrical feed-in power, and
in a second supporting stage, draw power from the electrical feed-in power to reduce the electrical feed-in power such that the electrical feed-in power is less than the electrical generator power, wherein the second supporting stage is implemented after the first supporting stage has been completed.

19. The wind power installation as claimed in claim 18, wherein the switching device is configured to convert the electrical feed-in power into thermal power, wherein the switching device is configured to consume at least part of the electrical generator power to reduce the electrical feed-in power.

20. The wind power installation as claimed in claim 19, wherein the switching device is configured to convert electrical power corresponding to the generator nominal power into the thermal power for at least three seconds.

21. The wind power installation as claimed in claim 19, wherein the switching device is a chopper bank and comprises a rectifier.

22. A wind farm comprising:
a plurality of wind power installations, wherein at least one wind power installation of the plurality of wind power installations is the wind power installation as claimed in claim 18, and
a wind farm controller configured to transmit control signals to the plurality of wind power installations and to receive status signals provided by the plurality of wind power installations to determine a negative electrical wind farm power or energy.

23. The wind farm as claimed in claim 22, wherein the wind farm controller is configured to:
request status signals from the at least one wind power installation, wherein the status signals are indicative of a readiness of switching devices of the at least one wind power installation to consume power or energy;
determine the negative electrical wind farm power or energy based on the requested status signals; and
provide a supply network operator and/or a control room controlling the wind farm with the determined negative electrical wind farm power or energy.

\* \* \* \* \*

UNITED STATES PATENT AND TRADEMARK OFFICE
CERTIFICATE OF CORRECTION

PATENT NO. : 10,972,029 B2  
APPLICATION NO. : 16/342468  
DATED : April 6, 2021  
INVENTOR(S) : Kai Busker et al.

Page 1 of 1

It is certified that error appears in the above-identified patent and that said Letters Patent is hereby corrected as shown below:

In the Claims

Column 16, Claim 18, Line 32:
"the first at least the portion of the"
Should read:
--the first portion of the--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*